United States Patent
Wu

(10) Patent No.: US 12,386,569 B2
(45) Date of Patent: Aug. 12, 2025

(54) METHOD AND APPARATUS FOR NETWORK CONFIGURATION

(71) Applicant: Zhuhai Pantum Electronics Co., Ltd., Zhuhai (CN)

(72) Inventor: Xiaohu Wu, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 118 days.

(21) Appl. No.: 18/468,789

(22) Filed: Sep. 18, 2023

(65) Prior Publication Data

US 2024/0094961 A1    Mar. 21, 2024

(30) Foreign Application Priority Data

Sep. 19, 2022    (CN) .......................... 202211136688.7

(51) Int. Cl.
G06F 3/12       (2006.01)
H04W 76/10      (2018.01)

(52) U.S. Cl.
CPC .......... *G06F 3/1236* (2013.01); *G06F 3/1203* (2013.01); *G06F 3/1231* (2013.01); *G06F 3/1286* (2013.01); *G06F 3/1292* (2013.01); *H04W 76/10* (2018.02)

(58) Field of Classification Search
None
See application file for complete search history.

(56) References Cited

U.S. PATENT DOCUMENTS

| | | |
|---|---|---|
| 2014/0233053 A1 | 8/2014 | Kakutani |
| 2014/0378058 A1 | 12/2014 | Decuir et al. |
| 2020/0169922 A1 | 5/2020 | Ozturk et al. |

FOREIGN PATENT DOCUMENTS

| | | |
|---|---|---|
| CN | 108668336 A | 10/2018 |
| CN | 112436985 A | 3/2021 |
| CN | 112469055 A | 3/2021 |
| CN | 113132989 A | 7/2021 |
| CN | 113709739 A | 11/2021 |
| CN | 114301628 A | 4/2022 |
| CN | 114697958 A | 7/2022 |
| CN | 114980266 A | 8/2022 |
| EP | 4175335 A1 | 5/2023 |
| RU | 2705008 C1 | 11/2019 |

*Primary Examiner* — Lennin R Rodriguezgonzalez
(74) *Attorney, Agent, or Firm* — Anova Law Group, PLLC

(57) ABSTRACT

A network configuration method includes establishing wireless connection with n second image-forming apparatuses, where n is an integer greater than or equal to 1; updating a connection state information table pre-stored according to the wireless connection established with the n second image-forming apparatuses; based on the updated connection state information table, determining m image-forming apparatuses to-be-connected-to-network, where m is an integer greater than or equal to 0; and sending network connection information for connecting a local area network to the m image-forming apparatuses to-be-connected-to-network, such that the m image-forming apparatuses to-be-connected-to-network are connected to the local area network according to the network connection information. The solutions in embodiments of the present disclosure simplify network connection configuration operations of the image-forming apparatuses.

19 Claims, 10 Drawing Sheets

METHOD AND APPARATUS FOR NETWORK CONFIGURATION

CROSS-REFERENCE TO RELATED APPLICATION

This application claims the priority to Chinese patent application No. 202211136688.7, filed on Sep. 19, 2022, the entirety of which is incorporated herein by reference.

TECHNICAL FIELD

The present disclosure generally relates to the field of image-forming apparatus technology and, more particularly, relates to a method and an apparatus for network configuration.

BACKGROUND

An image-forming apparatus is a device that forms images on a recording medium based on image-forming principle, such as a printer, copier, a facsimile machine, a multifunctional image making and copying device, a xerographic printing device, and any other similar devices.

When the image-forming apparatus is connected to a local area network, the image-forming apparatus may first need to perform network connection configuration. In existing technology, the network connection configuration manner of the image-forming apparatus may include that the image-forming apparatus establishes connection with a computer device, and the image-forming apparatus obtains network connection information from the computer device and is connected to the local area network according to the network connection information. For example, the network connection information includes the S SID (service set identifier) and a password of a router, and the image-forming apparatus establishes connection with the router according to the S SID and the password of the router, that is, the image-forming apparatus is connected to the local area network according to the network connection information. Such manner in existing technology may be more suitable for network connection configuration of single image-forming apparatus. When multiple image-forming apparatuses need to be connected to the local area network, the network connection configuration operation may be complicated if such network configuration manner is still used.

SUMMARY

Embodiments of the present disclosure provide a method and an apparatus for network configuration, which can simplify the network connection configuration operations of image-forming apparatuses.

One aspect of the present disclosure provides a network configuration method. The method is applied to a first image-forming apparatus. The method includes: establishing wireless connection with n second image-forming apparatuses, n being an integer greater than or equal to 1; updating a connection state information table pre-stored according to the wireless connection established with the n second image-forming apparatuses; based on the updated connection state information table, determining m image-forming apparatuses to-be-connected-to-network, m being an integer greater than or equal to 0; and sending network connection information for connecting a local area network to the m image-forming apparatuses to-be-connected-to-network, such that the m image-forming apparatuses to-be-connected-to-network are connected to the local area network according to the network connection information.

Another aspect of the present disclosure provides a network configuration apparatus. The network configuration apparatus is deployed on a first image-forming apparatus and includes: a communication module, configured to establish wireless connection with n second image-forming apparatuses, n being an integer greater than or equal to 1; an information update module, configured to update a connection state information table pre-stored according to the wireless connection established with the n second image-forming apparatuses; and a determination module, configured to, based on the updated connection state information table, determine m image-forming apparatuses to-be-connected-to-network, m being an integer greater than or equal to 0. The communication module is further configured to send network connection information for connecting a local area network to the m image-forming apparatuses to-be-connected-to-network. The m image-forming apparatuses to-be-connected-to-network are connected to the local area network according to the network connection information.

Another aspect of the present disclosure provides an image-forming apparatus. The image-forming apparatus includes a memory storing program instructions; and a processor communicatively coupled to the memory and, when the program instructions being executed, configured to: establish wireless connection with n second image-forming apparatuses, n being an integer greater than or equal to 1; configured to update a connection state information table pre-stored according to the wireless connection established with the n second image-forming apparatuses; and configured to, based on the updated connection state information table, determine m image-forming apparatuses to-be-connected-to-network, m being an integer greater than or equal to 0. The processor is further configured to send network connection information for connecting a local area network to the m image-forming apparatuses to-be-connected-to-network. The m image-forming apparatuses to-be-connected-to-network are connected to the local area network according to the network connection information.

Another aspect of the present disclosure provides a non-transitory computer-readable storage medium containing a stored program, that when being executed, causes a device where the non-transitory computer-readable storage medium is located to execute a network configuration method, applied to a first image-forming apparatus. The method includes establishing wireless connection with n second image-forming apparatuses, n being an integer greater than or equal to 1; updating a connection state information table pre-stored according to the wireless connection established with the n second image-forming apparatuses; based on the updated connection state information table, determining m image-forming apparatuses to-be-connected-to-network, m being an integer greater than or equal to 0; and sending network connection information for connecting a local area network to the m image-forming apparatuses to-be-connected-to-network, such that the m image-forming apparatuses to-be-connected-to-network are connected to the local area network according to the network connection information.

In embodiments of the present disclosure, the first image-forming apparatus establishes wireless connection with n second image-forming apparatuses and selects the image-forming apparatuses to-be-connected-to-network from the n second image-forming apparatuses. The first image-forming apparatus may transfer the network connection information to each image-forming apparatus to-be-connected-to-network, so that the image-forming apparatus to-be-connected-to-network may be connected to the local area network according to the network connection information. During such process, the image-forming apparatuses to-be-connected-to-network do not need to establish connection with the computer device one by one, so that the network connection operation process of the image-forming apparatuses may be simplified.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings, which need to be used for describing various embodiments, are described below. Obviously, the drawings in following description are merely some embodiments of the present disclosure. For those skilled in the art, other drawings may be obtained in accordance with these drawings without creative effort.

DETAILED DESCRIPTION

In order to clearly describe the objectives, technical solutions and advantages of embodiments of the present disclosure, technical solutions in embodiments of the present disclosure are clearly and complete described in conjunction with accompanying drawings in embodiments of the present disclosure. Obviously, described embodiments are only a part of embodiments of the present disclosure, rather than all embodiments. Based on embodiments of the present disclosure, all other embodiments obtained by those skilled in the art without creative work shall fall within the protection scope of the present disclosure.

Terms used in embodiments of the present disclosure are only for the purpose of describing specific embodiments and are not intended to limit the present disclosure. Singular forms "a", "said" and "the" used in embodiments of the present disclosure and appended claims are also intended to include plural forms unless the context clearly indicates otherwise.

In order to solve the problem in the existing technology that the network configuration operations of the image-forming apparatuses are complicated, embodiments of the present disclosure provide a network configuration method. The network configuration method in embodiments of the present disclosure is applied to an image-forming apparatus. The image-forming apparatus may be, for example, a printer, a copying machine, a facsimile machine, a multi-functional image making and copying apparatus, a xerographic printing apparatus, and any other similar apparatus.

The network configuration method in embodiments of the present disclosure supports network connection information transfer among image-forming apparatuses; and based on the method in embodiments of the present disclosure, multiple image-forming apparatuses may conveniently and flexibly perform network connection configuration. For example, in order to support network connection information transfer among image-forming apparatuses, the image-forming apparatuses in embodiments of the present disclosure may be configured with communication modules. The communication module may be a WIFI module. Based on the WIFI module, the image-forming apparatus may support an STA (Station) mode and/or an AP (Access Point) mode. The image-forming apparatus may establish wireless connection with one or more other image-forming apparatuses in the STA mode and/or the AP mode, and then the network connection information may be transferred among the image-forming apparatuses.

Figure 1A:
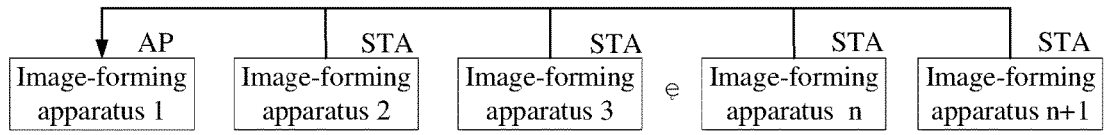
FIG. 1A illustrates a topological structural schematic of components of an image-forming apparatus according to exemplary embodiments of the present disclosure.
Figure 1B:
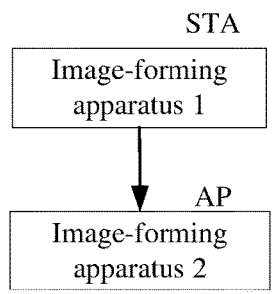
FIG. 1B illustrates another topological structural schematic of components of an image-forming apparatus according to exemplary embodiments of the present disclosure.
Figure 1C:
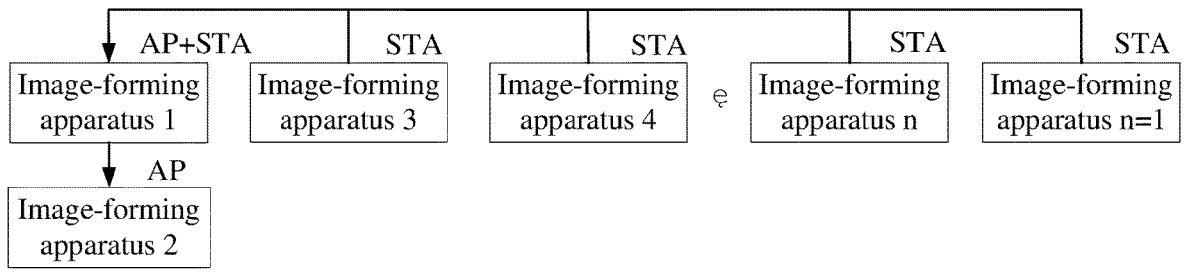
FIG. 1C illustrates another topological structural schematic of components of an image-forming apparatus according to exemplary embodiments of the present disclosure.

FIGS. 1A-1C respectively illustrate topological structural schematics of components of an image-forming apparatus according to exemplary embodiments of the present disclosure. As shown in FIG. 1A, the image-forming apparatus 1 may turn on the AP mode; and the image-forming apparatus 2, the image-forming apparatus 3 . . . , the image-forming apparatus n and the image-forming apparatus n+1 may respectively turn on the STA mode, such that the image-forming apparatus 2, the image-forming apparatus 3 . . . , the image-forming apparatus n+1 in turned-on STA mode may be connected to the image-forming apparatus 1 in the AP mode. As shown in FIG. 1B, the image-forming apparatus 1 may turn on the STA mode, and the image-forming apparatus 2 may turn on the AP mode, such that the image-forming apparatus 1 may be connected to the image-forming apparatus 2. As shown in FIG. 1C, the image-forming apparatus 1 may turn on the AP mode and the STA mode simultaneously, such that the image-forming apparatus 1 in the STA model may establish wireless connection with the image-forming apparatus 2 in the AP mode. In addition, the image-forming apparatus 1 in the AP mode may establish wireless connections with image-forming apparatuses 3, 4 . . . , image-forming apparatus n+1 in the STA mode.

In the topological structures of the components of the image-forming apparatuses, the image-forming apparatus with the turned-on AP mode is called an upstream device, and the image-forming apparatus with the turned-on STA mode is called a downstream device. As shown in FIG. 1C, the image-forming apparatus 2 may be the upstream device of the image-forming apparatus 1; the image-forming apparatus 1 may be the upstream device of the image-forming apparatuses 3, 4 . . . , and n+1; and the image-forming apparatuses 3, 4 . . . , and n+1 may be downstream devices of the image-forming apparatus 1. In the topological structures shown in FIGS. 1A-1C, after the image-forming apparatus obtains the network connection information, the network connection information may be transferred among the upstream devices and the downstream devices.

In some embodiments, the image-forming apparatuses 1, 2 . . . , and n+1 may all store connection state information tables. Optionally, the connection state information table may record real-time connection state of the image-forming apparatus. According to the connection state information table, the image-forming apparatus may inquire one or more other image-forming apparatuses connected with itself, and furthermore, the image-forming apparatus may send the network connection information to one or more other image-forming apparatuses or obtain the network connection information from one or more other image-forming apparatuses. The connection state information table is described below taking the image-forming apparatus 1 as an example. Optionally, the connection state information table stored in the image-forming apparatuses 2 . . . , and n+1 may refer to the connection state information table of the image-forming apparatus 1.

In some embodiments, when the image-forming apparatus 1 is connected to a router, the connection state information table may record the IP address assigned to the image-forming apparatus 1 by the router. In some embodiments, as shown in FIG. 1A, when the image-forming apparatus 1 turns on the AP mode, the image-forming apparatus 1 may assign IP addresses to the image-forming apparatuses 2, 3 . . . , and n+1 in the STA mode. The image-forming apparatuses 2, 3 . . . , and n+1 may establish wireless connection with the image-forming apparatus 1 according to the IP address assigned by the image-forming apparatus 1. The connection state information table of the image-forming apparatus 1 may record the IP addresses assigned by the image-forming apparatus 1 to the image-forming apparatuses 2, 3 . . . , and n+1. In some embodiments, as shown in FIG. 1B, when the image-forming apparatus 1 turns on the STA mode and is connected to the image-forming apparatus 2 in the turned-on AP mode, the connection state information table of the image-forming apparatus 1 may record the IP address assigned to the image-forming apparatus 1 by the image-forming apparatus 2.

In some embodiments, as shown in FIG. 1C, the first image-forming apparatus 1 may turn on the STA mode and the AP mode simultaneously. The image-forming apparatus 1 in the STA mode may establish wireless connection with the image-forming apparatus 2 in the AP mode. As shown in Table 1, in the STA mode column of Table 1, the SSID (service set identifier) and password of the image-forming apparatus 2 connected to the image-forming apparatus 1 and the IP address assigned by the image-forming apparatus 2 to the image-forming apparatus 1 may be recorded. The image-forming apparatus 1 in the AP mode may support assigning IP addresses to and establishing wireless connection with the image-forming apparatuses 3, 4 . . . , and n+1 in the STA mode. As shown in Table 1, the SSID and password of the image-forming apparatus 1, and the IP addresses assigned by the image-forming apparatus 1 to the image-forming apparatuses 3, 4 . . . , and n+1 in the STA mode may be recorded in the AP mode column.

TABLE 1

Connection state information table

| Mode | SSID | Password | IP |
|---|---|---|---|
| STA mode | XXXX | XXXX | XX.XX. XX.XX |
| AP mode | ** |  | ...03 |
| AP mode | ** |  | ...04 |
| ... | ... | ... | ... |
| AP mode | ** |  | ...0n + 1 |

Based on the topological structures shown in FIGS. 1A-1C, embodiments of the present disclosure provide a network configuration method. The network configuration method may be applied to the image-forming apparatus 1. The image-forming apparatus 1 may obtain the network connection information in advance. The image-forming apparatus 1 may transfer the network connection information to one or more other image-forming apparatuses based on the methods in embodiments of the present disclosure, for example, to the image-forming apparatuses 2, 3 . . . , and n+1. The image-forming apparatuses 2, 3 . . . , and n+1 may directly obtain the network connection information from the image-forming apparatus 1 and don't need to be connected to the computer device one by one to obtain the network connection information. In such way, the network configuration process of the image-forming apparatuses may be simplified. For convenience of description, the image-forming apparatus 1 is referred to as the first image-forming apparatus, and one or more other image-forming apparatuses other than the first image-forming apparatus are referred to as second image-forming apparatuses, for example, above-mentioned image-forming apparatuses 2, 3, . . . and n+1 are respectively referred to as second image-forming apparatuses.

Figure 2:
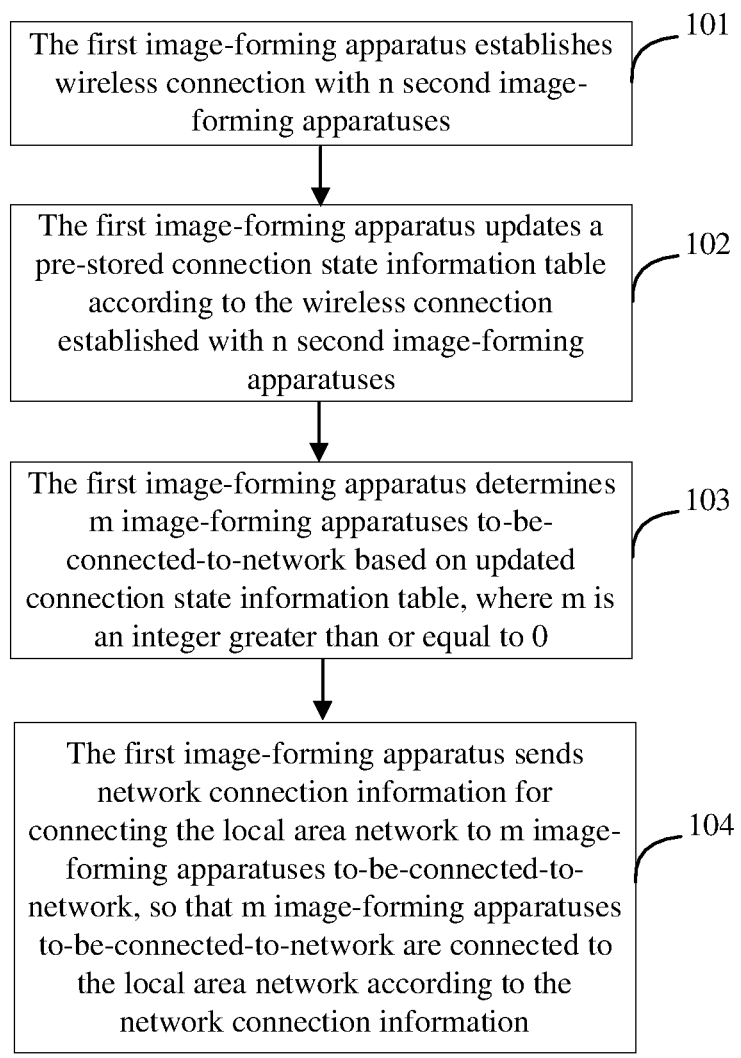
FIG. 2 illustrates a flow chart of a network configuration method according to exemplary embodiments of the present disclosure.

Referring to FIG. 2, FIG. 2 illustrates a flow chart of a network configuration method according to exemplary embodiments of the present disclosure. As shown in FIG. 2, the method may include following exemplary processing steps.

At 101, the first image-forming apparatus may establish wireless connection with n second image-forming apparatuses. In some embodiments, as shown in FIG. 1A, the first image-forming apparatus may turn on the AP mode. The first image-forming apparatus may establish wireless connection with n second image-forming apparatuses in the turned-on STA mode. In some embodiments, as shown in FIG. 1B, the first image-forming apparatus may turn on the STA mode, and the first image-forming apparatus may establish connection with the second image-forming apparatus in the AP mode. At this point, n takes the value of 1. In some embodiments, as shown in FIG. 1C, the first image-forming apparatus may turn on the AP mode and the STA mode simultaneously. The first image-forming apparatus in the AP mode may establish connection with n−1 second image-forming apparatuses, and the first image-forming apparatus in the STA mode may establish connection with one second image-forming apparatus in the AP mode. At this point, n may be greater than or equal to 2.

At 102, the first image-forming apparatus may update a pre-stored connection state information table according to the wireless connection established with n second image-forming apparatuses, where updated connection state information table may be referred to Table 1, which may not be described in detail herein.

At 103, the first image-forming apparatus may determine m image-forming apparatuses to-be-connected-to-network based on updated connection state information table, where m may be an integer greater than or equal to 0. Optionally, m may be less than n.

At 104, the first image-forming apparatus may send the network connection information for connecting the local area network to m image-forming apparatuses to-be-connected-to-network, so that m image-forming apparatuses to-be-connected-to-network may be connected to the local area network according to the network connection information.

In embodiments of the present disclosure, the first image-forming apparatus may establish wireless connection with n second image-forming apparatuses and select image-forming apparatuses to-be-connected-to-network from n second image-forming apparatuses. The first image-forming apparatus may send the network connection information to the image-forming apparatus to-be-connected-to-network, so that the image-forming apparatus to-be-connected-to-network may be connected to the local area network according to the network connection information. During such process, there is no need to establish connection between the image-forming apparatuses to-be-connected-to-network and the computer device one by one, thereby simplifying the network connection operation process of the image-forming apparatuses.

Figure 3:
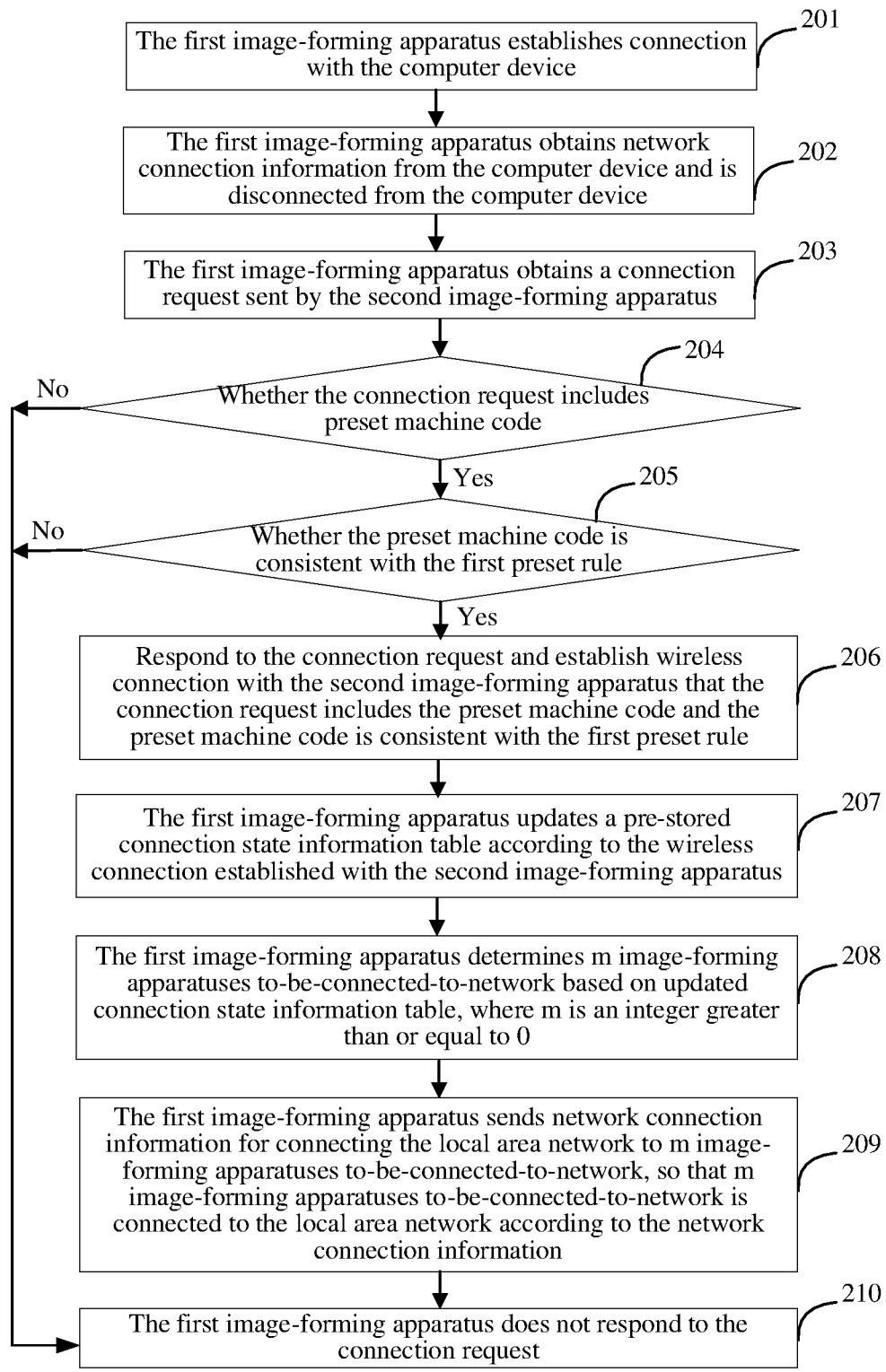
FIG. 3 illustrates a flow chart of another network configuration method according to exemplary embodiments of the present disclosure.

Referring to FIG. 3, FIG. 3 illustrates a flow chart of another network configuration method according to exemplary embodiments of the present disclosure. As shown in FIG. 3, the method may include following exemplary processing steps.

At 201, the first image-forming apparatus may establish connection with the computer device. Optionally, the first image-forming apparatus may turn on the AP mode, and the computer device may be configured as STA to establish wireless connection with the first image-forming apparatus.

At 202, the first image-forming apparatus may obtain the network connection information from the computer device and be disconnected from the computer device. After the computer device is disconnected from the first image-forming apparatus, the computer device may establish connection with a routing device.

At 203, the first image-forming apparatus may obtain a connection request sent by the second image-forming apparatus. In some embodiments, the first image-forming apparatus may turn on the AP mode. The first image-forming apparatus may obtain connection requests of n second image-forming apparatuses in the turned-on STA mode. In some embodiments, the first image-forming apparatus may turn on the STA mode, and the first image-forming apparatus may obtain a connection request from the second image-forming apparatus in the AP mode. At this point, n takes the value of 1. In some embodiments, the first image-forming apparatus may turn on the AP mode and the STA mode simultaneously. The first image-forming apparatus in the AP mode may obtain connection requests from n−1 second image-forming apparatuses in the STA mode, and the first image-forming apparatus in the STA mode may obtain a connection request from one second image-forming apparatus in the AP mode. At this point, n may be greater than or equal to 2.

At 204, the first image-forming apparatus may decide whether received connection request includes a preset machine code. Optionally, the preset machine code may be configured to determine whether the image-forming apparatus is a trusted device. In some embodiments, the preset machine code may include brands, models or other possible keywords and flags. Whether the image-forming apparatus is a trusted device may be decided according to the preset machine code. For example, according to the brand information in the preset machine code, whether the image-forming apparatus is a device of a trusted merchant may be decided. In embodiments of the present disclosure, according to the preset machine code, the network connection information may be controlled to be transferred among trusted image-forming apparatuses, which may prevent untrusted image-forming apparatuses from obtaining the network connection information and connecting the local area network, thereby preventing untrusted image-forming apparatuses from stealing local area network information. In some embodiments, if the connection request does not include the preset machine code, the first image-forming apparatus may not establish wireless connection with the second image-forming apparatus and execute step 210. If the connection request includes the preset machine code, the first image-forming apparatus may execute step 205.

At 205, the first image-forming apparatus may decide whether the preset machine code in each connection request is consistent with the first preset rule. If it is not consistent with the first preset rule, execute step 210. If it is consistent with the first preset rule, execute step 206. In embodiments of the present disclosure, when the connection request obtained by the first image-forming apparatus includes the preset machine code, the first image-forming apparatus may further decide whether the preset machine code is consistent with the first preset rule. Optionally, the first preset rule may be configured as required. In some embodiments, deciding whether the preset machine code is consistent with the first preset rule may include deciding whether the preset machine code contains preset brand information. Optionally, the preset brand information may be implemented as keywords, markers or brand logos. When the preset machine code contains preset brand information, it is determined that the preset machine code may be consistent with the first preset rule. That is, in embodiments of the present disclosure, the image-forming apparatus of the preset brand may be allowed to be connected to the local area network. In some embodiments, deciding whether the preset machine code is consistent with the first preset rule may include deciding whether corresponding image-forming apparatus is included in a preset whitelist according to the preset machine code, and if corresponding image-forming apparatus is included in the preset whitelist, then determining whether the preset the machine code is consistent with the first preset rule. That is, in embodiments of the present disclosure, the image-forming apparatuses included in the preset whitelist may be allowed to be connected to the local area network.

At 206, the first image-forming apparatus may respond to the connection request and establish wireless connection with the second image-forming apparatus that the connection request includes the preset machine code, and the preset machine code is consistent with the first preset rule.

At 207, the first image-forming apparatus may update the pre-stored connection state information table according to the wireless connection established with the second image-forming apparatus.

At 208, the first image-forming apparatus may determine m image-forming apparatuses to-be-connected-to-network based on updated connection state information table, where m may be an integer greater than or equal to 0.

At 209, the first image-forming apparatus may send network connection information for connecting the local area network to m image-forming apparatuses to-be-connected-to-network, so that m image-forming apparatuses to-be-connected-to-network may be connected to the local area network according to the network connection information.

At 210, the first image-forming apparatus may not respond to the connection request.

In embodiments of the present disclosure, the first image-forming apparatus may select trusted image-forming apparatuses according to whether the connection request sent by each second image-forming apparatus contains the preset machine code and whether the preset machine code is consistent with the first preset rule. In such way, the network connection information may be controlled to only be transferred among trusted image-forming apparatuses, which may prevent untrusted image-forming apparatuses from connecting the local area network, thereby ensuring data security in the local area network and preventing untrusted image-forming apparatuses from stealing network information.

Figure 4:
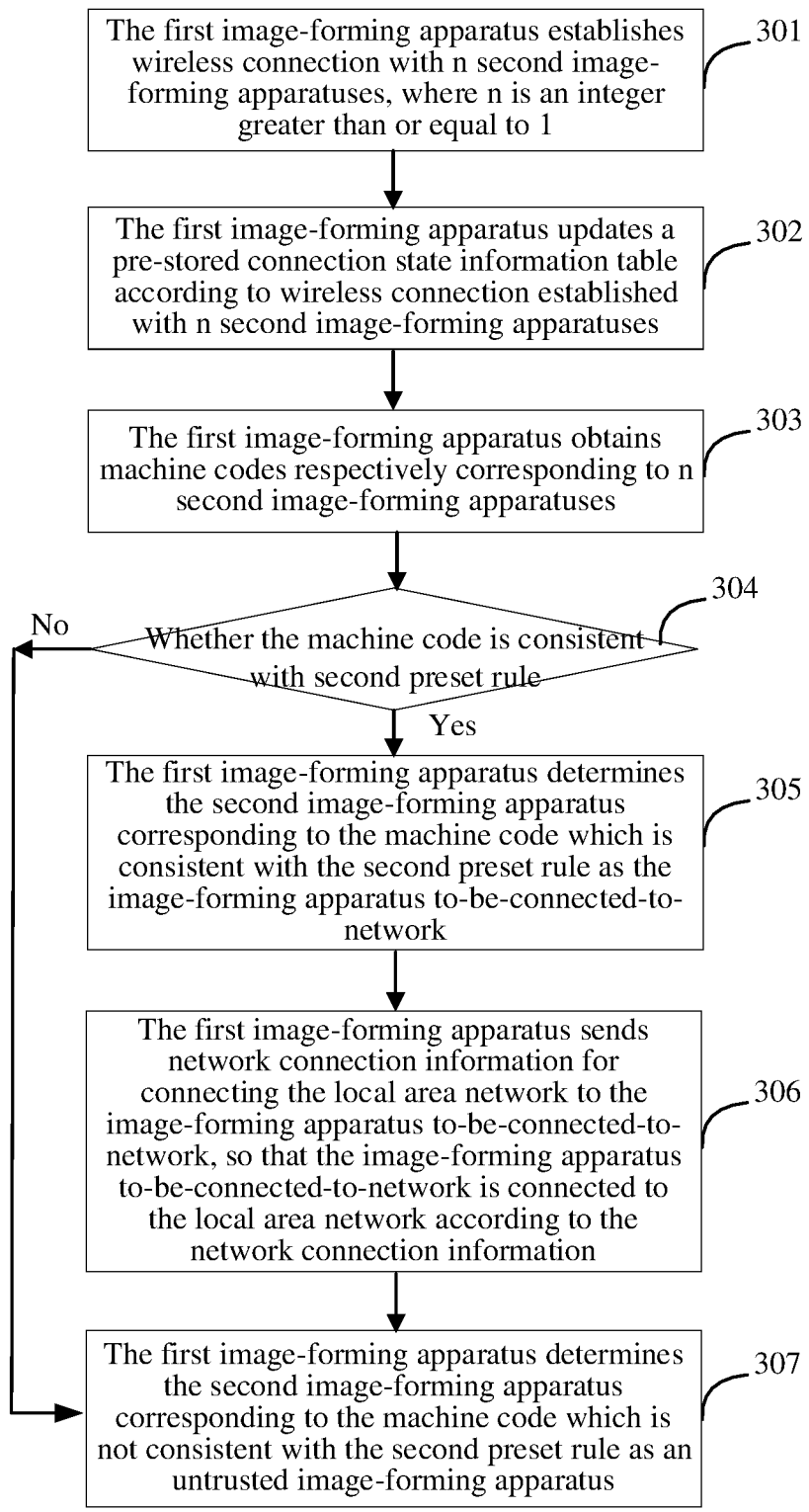
FIG. 4 illustrates a flow chart of another network configuration method according to exemplary embodiments of the present disclosure.

Referring to FIG. 4, FIG. 4 illustrates a flow chart of another network configuration method according to exemplary embodiments of the present disclosure. As shown in FIG. 4, the method may include following exemplary processing steps.

At 301, the first image-forming apparatus may establish wireless connection with n second image-forming apparatuses, where n may be an integer greater than or equal to 1.

At 302, the first image-forming apparatus may update the pre-stored connection state information table according to wireless connection established with n second image-forming apparatuses.

At 303, the first image-forming apparatus may obtain machine codes respectively corresponding to n second image-forming apparatuses.

At 304, the first image-forming apparatus may decide whether the machine codes of n second image-forming apparatuses are all consistent with a second preset rule. If the machine codes of n second image-forming apparatuses are consistent with the second preset rule, execute step 305; if the machine codes of n second image-forming apparatuses are not consistent with the second preset rule, execute step 307.

At 305, the first image-forming apparatus may determine the second image-forming apparatus corresponding to the machine code which is consistent with the second preset rule as the image-forming apparatus to-be-connected-to-network. Optionally, the second preset rule may be configured to decide whether corresponding image-forming apparatus is a trusted device based on the machine code. Optionally, the second preset rule may be same as above-mentioned first preset rule. Optionally, the second preset rule may also be different from above-mentioned first preset rule.

At 306, the first image-forming apparatus may send the network connection information for connecting the local area network to the image-forming apparatus to-be-connected-to-network, so that the image-forming apparatus to-be-connected-to-network may be connected to the local area network according to the network connection information.

At 307, the first image-forming apparatus may determine the second image-forming apparatus corresponding to the machine code that is not consistent with the second preset rule as an untrusted image-forming apparatus. Optionally, the first image-forming apparatus may not provide the network connection information to corresponding image-forming apparatus, which may prevent the untrusted image-forming apparatus from connecting the local area network.

In embodiments of the present disclosure, the first image-forming apparatus may establish wireless connection with n second image-forming apparatuses. When the first image-forming apparatus needs to transfer the network connection information, the machine code of each second image-forming apparatus may be obtained, and whether each second image-forming apparatus is a trusted image-forming apparatus may be decided according to the machine code of each second image-forming apparatus. Based on the method in embodiments of the present disclosure, the network connection information may only be transferred among trusted image-forming apparatuses, which may prevent untrusted image-forming apparatuses from obtaining the network connection information and connecting the local area network. In such way, data security in the local area network may be ensured, and network information may be prevented from being stolen by untrustworthy image-forming apparatuses.

Figure 5:
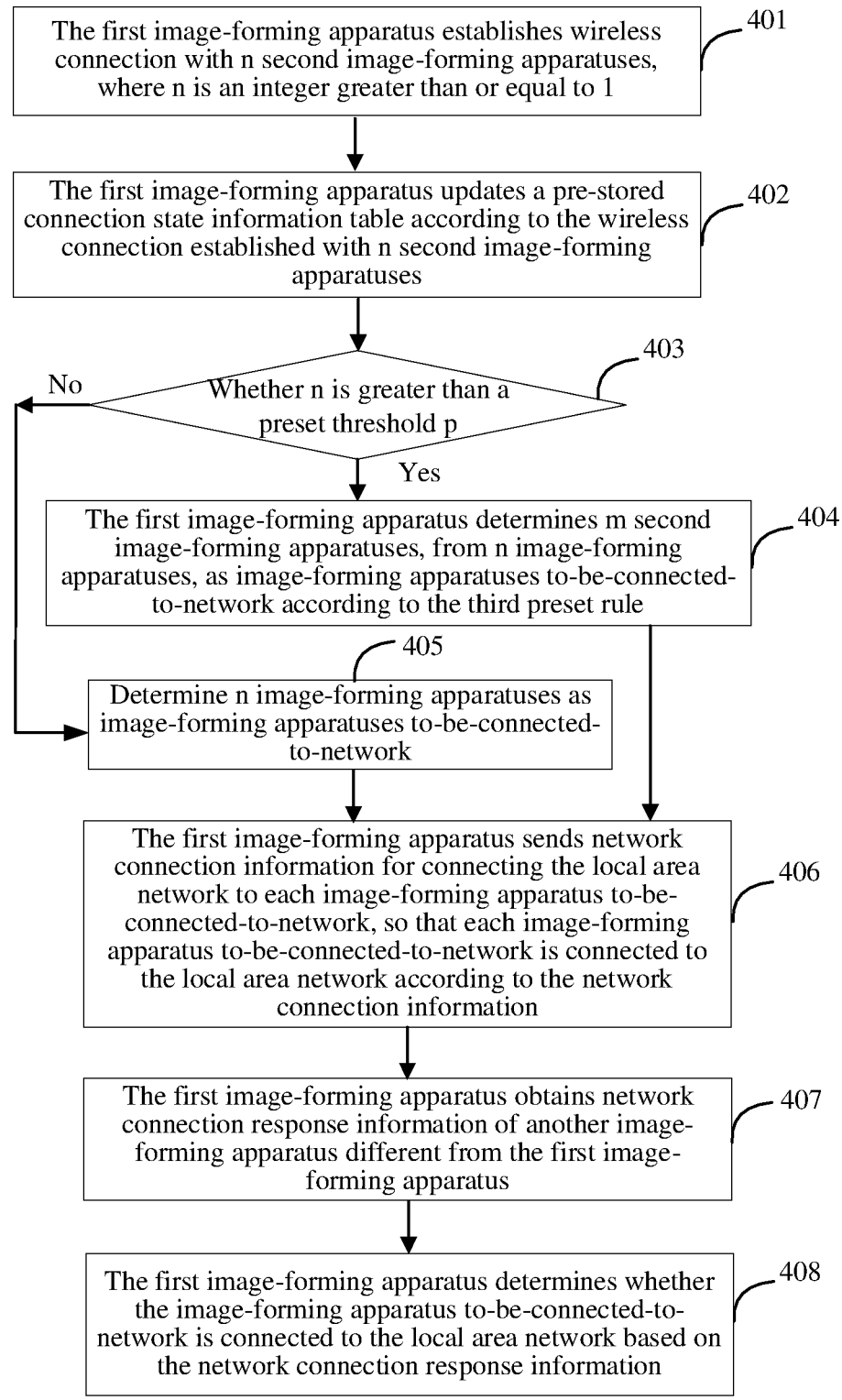
FIG. 5 illustrates a flow chart of another network configuration method according to exemplary embodiments of the present disclosure.

Referring to FIG. 5, FIG. 5 illustrates a flow chart of another network configuration method according to exemplary embodiments of the present disclosure. As shown in FIG. 5, the method may include following exemplary processing steps.

At 401, the first image-forming apparatus may establish wireless connection with n second image-forming apparatuses, where n may be an integer greater than or equal to 1.

At 402, the first image-forming apparatus may update the pre-stored connection state information table according to the wireless connection established with n second image-forming apparatuses.

At 403, the first image-forming apparatus may decide a magnitude relationship between n and a preset threshold p, where the preset threshold p may be an integer greater than or equal to m. If n is greater than or equal to the preset threshold p, execute step 404; and if n is less than the preset threshold p, execute step 405.

At 404, the first image-forming apparatus may determine, from n second image-forming apparatuses, m second image-forming apparatuses as the image-forming apparatuses to-be-connected-to-network according to a third preset rule. Optionally, the third preset rule may be configured as required. Optionally, the third preset rule may be, for example, sorting n second image-forming apparatuses according to the descending order of signal strength and selecting the first m second image-forming apparatuses as the image-forming apparatuses to-be-connected-to-network. Optionally, the third preset rule may also be, for example, sorting n second image-forming apparatuses according to the chronological order of wireless connection establishment with the second image-forming apparatuses and selecting the first m second image-forming apparatuses as the image-forming apparatuses to-be-connected-to-network.

At 405, if n is less than the preset threshold p, n second image-forming apparatuses may be determined as the image-forming apparatuses to-be-connected-to-network.

At 406, the first image-forming apparatus may send the network connection information for connecting the local area network to each image-forming apparatus to-be-connected-to-network, so that each image-forming apparatus to-be-connected-to-network may be connected to the local area network according to the network connection information.

At 407, the first image-forming apparatus may obtain network connection response information of one or more other image-forming apparatuses different from the first image-forming apparatus.

At 408, the first image-forming apparatus may determine whether the image-forming apparatus to-be-connected-to-network is connected to the local area network based on the network connection response information.

In embodiments of the present disclosure, before executing above step 403, the first preset rule or the second preset rule may also be decided according to FIGS. 3-4 to ensure that the image-forming apparatus connected to the local area network is a trusted image-forming apparatus.

In embodiments of the present disclosure, the preset threshold p may be configured, and the number of image-forming apparatuses connecting the local area networks may be limited according to the preset threshold p. In embodiments of the present disclosure, by controlling the number of image-forming apparatuses connecting the local area network, the transfer range of the network connection information may be controlled, the random distribution of the network connection information may be avoided, and excessive large quantity of image-forming apparatuses connected to the local area network, which increases operating load of the router, may be avoided.

In embodiments of the present disclosure, after the first image-forming apparatus sends the network connection information to each image-forming apparatus to-be-connected-to-network, the first image-forming apparatus may also monitor whether each image-forming apparatus to-be-connected-to-network is connected to the local area network. For example, the first image-forming apparatus monitoring whether each image-forming apparatus to-be-connected-to-network is connected to the local area network may include following exemplary manners.

For manner 1, the first image-forming apparatus may maintain wireless connection with each image-forming apparatus to-be-connected-to-network. The first image-forming apparatus may directly send an inquiry instruction to each image-forming apparatus to-be-connected-to-network. The first image-forming apparatus may determine whether each image-forming apparatus to-be-connected-to-network is connected to the local area network according to network connection response information of each image-forming apparatus to-be-connected-to-network.

For manner 2, the first image-forming apparatus may be connected to the local area network. The first image-forming apparatus may send a broadcast message on the local area network. Optionally, the reason why the first image-forming apparatus sends the broadcast message on the local area network may be that when the image-forming apparatuses to-be-connected-to-network are connected to the local area network, the router may re-assign network IP addresses for all image-forming apparatuses to-be-connected-to-network. The first image-forming apparatus cannot determine the network connection IP address of each image-forming apparatus to-be-connected-to-network. The first image-forming apparatus may receive network connection response information fed back by each image-forming apparatus to-be-connected-to-network. Optionally, the network connection response information may contain the machine code corresponding to each image-forming apparatus to-be-connected-to-network. The first image-forming apparatus may determine whether each image-forming apparatus to-be-connected-to-network is connected to the local area network according to the machine code in received network connection response information.

For manner 3, the first image-forming apparatus may disconnect the wireless connection with each image-forming apparatus to-be-connected-to-network, and establish connection with the route, that is, may be connected to the local area network. Each image-forming apparatus to-be-connected-to-network may be connected to the local area network using the IP address when each image-forming apparatus to-be-connected-to-network is connected to the first image-forming apparatus as a static IP address. That is, the IP address of the first image-forming apparatus when the first image-forming apparatus establishes wireless connection with each image-forming apparatus to-be-connected-to-network may be at a same network segment as the router, and the first image-forming apparatus may determine the IP address of each image-forming apparatus to-be-connected-to-network which is connected to the local area network. In such scenario, the first image-forming apparatus may send an inquiry instruction to each image-forming apparatus according to the static IP address of each image-forming apparatus to-be-connected-to-network on the local area network, so that each image-forming apparatus to-be-connected-to-network may send network connection response information. The first image-forming apparatus may determine whether each image-forming apparatus to-be-connected-to-network is connected to the local area network according to whether each image-forming apparatus to-be-connected-to-network sends network connection response information.

Figure 6:
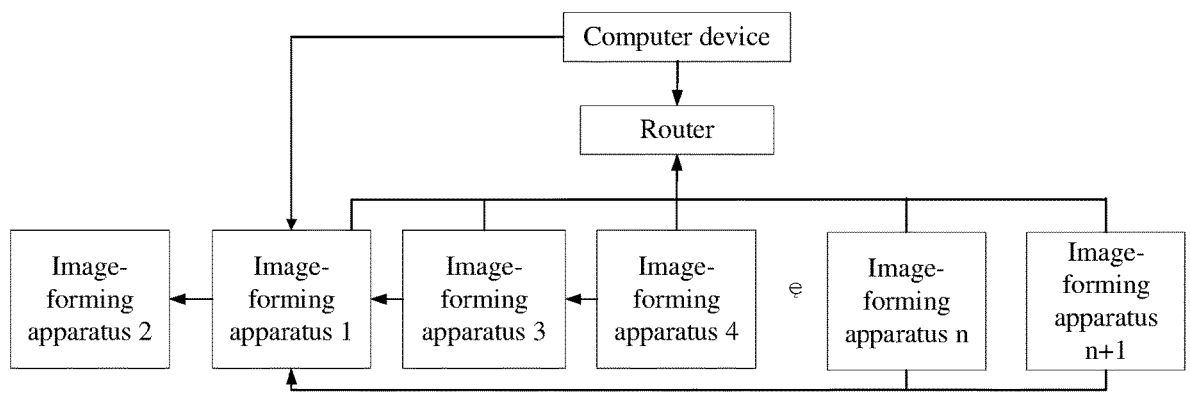
FIG. 6 illustrates another topological structural schematic of components of an image-forming apparatus according to exemplary embodiments of the present disclosure.

Referring to FIG. 6, FIG. 6 illustrates another topological structural schematic of components of the image-forming apparatus according to exemplary embodiments of the present disclosure. The topological structure shown in FIG. 6 may be a cascade structure. For example, the image-forming apparatus 1 may turn on the AP mode and the STA mode. The image-forming apparatus 1 in the SAT mode may establish wireless connection with the image-forming apparatus 2 in the AP mode. The image-forming apparatuses in the AP mode may respectively establish wireless connection with the image-forming apparatuses 3 . . . , and the image-forming apparatus n+1 in the STA mode. That is, the image-forming apparatus 2 may be the upstream device of the image-forming apparatus 1; the image-forming apparatus 1 may be the upstream device of the image-forming apparatuses 3, 5 . . . , and n+1; and the image-forming apparatuses 3, 5 . . . , and n+1 may be downstream devices of the image-forming apparatus 1.

The downstream device of the image-forming apparatus 1 may also be cascaded with other downstream devices again. As shown in FIG. 5, the image-forming apparatus 3 may also turn on the AP mode; and the image-forming apparatus 3 may establish connection with the image-forming apparatus 4 in the turned-on STA mode. That is, the image-forming apparatus 3 may be the upstream device of the image-forming apparatus 4, and the image-forming apparatus 4 may be the downstream device of the image-forming apparatus 3.

Figure 7:
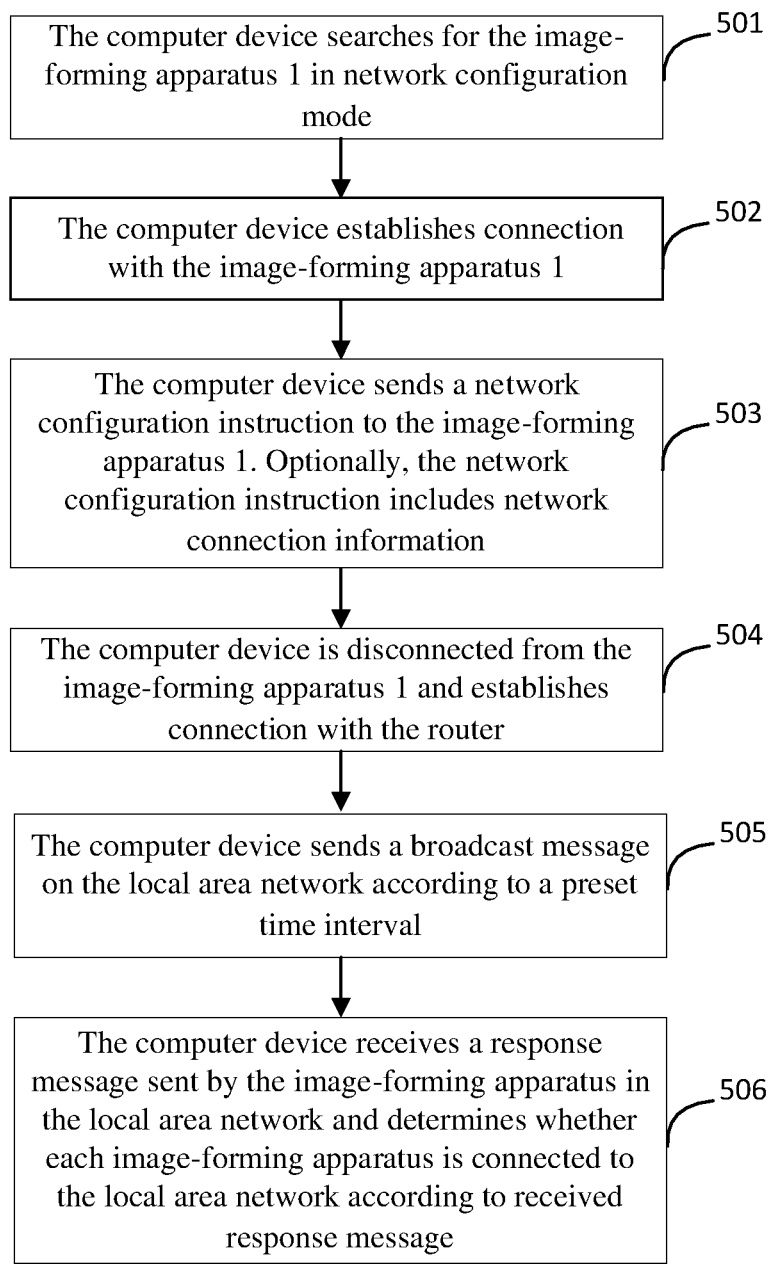
FIG. 7 illustrates a flow chart of a network configuration method executed by a computer device according to exemplary embodiments of the present disclosure.

Based on the topological structure shown in FIG. 6, the network configuration method executed by the computer device, as shown in FIG. 7, may include following exemplary steps.

At 501, the computer device may search for the image-forming apparatus 1 in the network configuration mode. Optionally, the image-forming apparatus 1 may turn on the network configuration mode in the AP mode. Optionally, the image-forming apparatus 1 may turn on the network configuration mode in the STA mode.

At 502, the computer device may establish connection with the image-forming apparatus 1. Optionally, the computer device may be configured as STA to establish wireless connection with the image-forming apparatus 1 in the AP mode. Optionally, the computer device may be configured as AP to establish wireless connection with the image-forming apparatus 1 in the STA mode.

At 503, the computer device may send a network configuration instruction to the image-forming apparatus 1. Optionally, the network configuration instruction may include the network connection information. Optionally, the network connection information may include the SSID and the password of the router.

At 504, the computer device may be disconnected from the image-forming apparatus 1 and establish connection with the router.

At 505, the computer device may send a broadcast message on the local area network according to a preset time interval. The broadcast message may be configured to trigger the image-forming apparatus connected to the local area network to send response information.

At 506, the computer device may receive response information sent by the image-forming apparatus in the local area network and determine whether each image-forming apparatus is connected to the local area network according to received response information.

Figure 8:
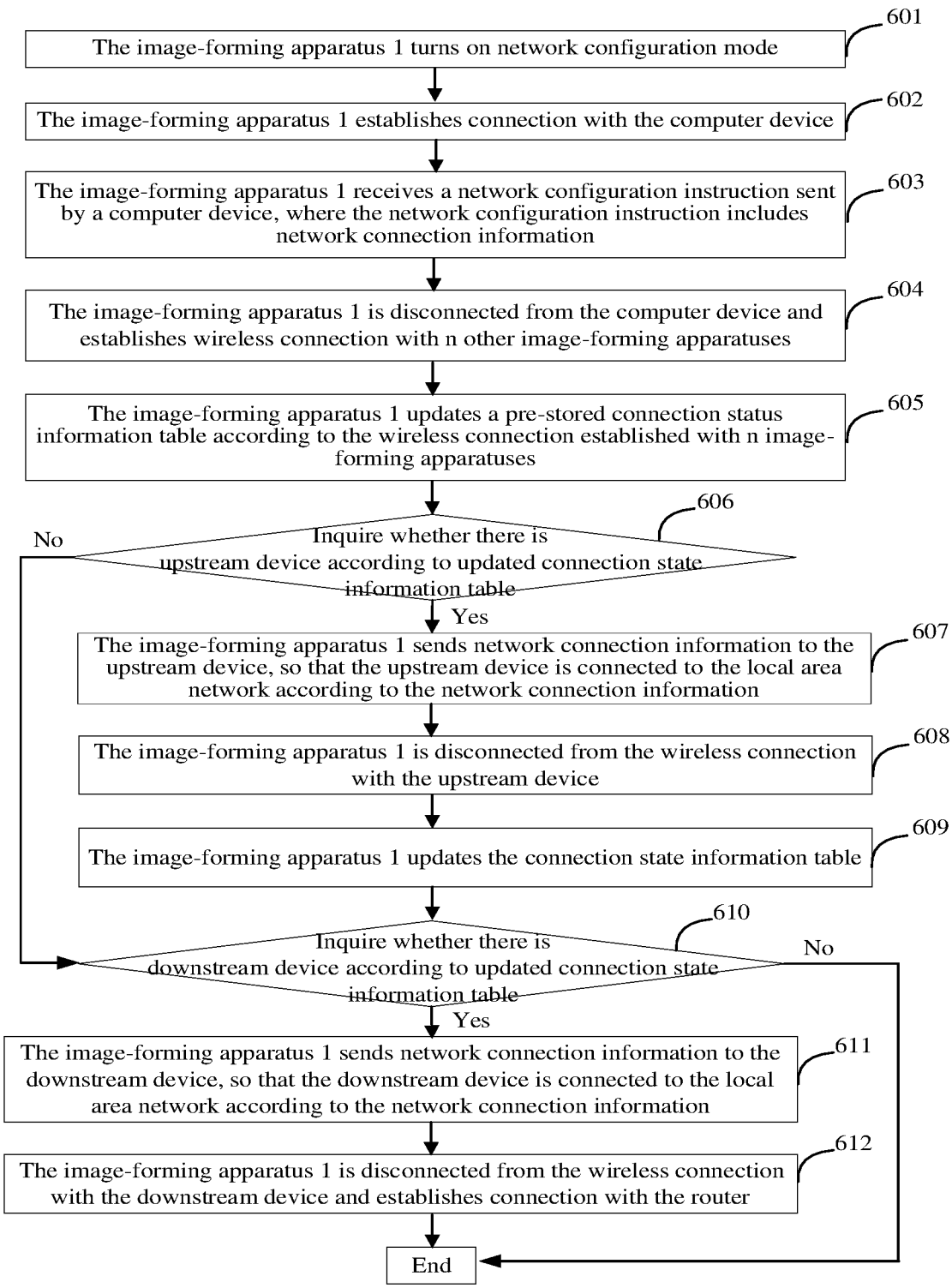
FIG. 8 illustrates a flow chart of a network configuration method executed by an image-forming apparatus according to exemplary embodiments of the present disclosure.

Based on the topological structure shown in FIG. 6, the network configuration method executed by the image-forming apparatus 1, as shown in FIG. 8, may include following exemplary steps.

At 601, the image-forming apparatus 1 may turn on the network configuration mode. Optionally, the image-forming apparatus 1 may turn on the network configuration mode in the AP mode. Optionally, the image-forming apparatus 1 may turn on the network configuration mode in the STA mode.

At 602, the image-forming apparatus 1 may establish connection with the computer device.

At 603, the image-forming apparatus 1 may receive the network configuration instruction sent by the computer device, where the network configuration instruction may include the network connection information.

At 604, the image-forming apparatus 1 may be disconnected from the computer device and establish wireless connections with n one or more other image-forming apparatuses. The wireless connection relationship between the image-forming apparatus 1 and n one or more other image-forming apparatuses is shown in FIG. 6. In some embodiments, the image-forming apparatus 1 may have established wireless connection with n one or more other image-forming apparatuses before being disconnected from the computer device. For example, image-forming apparatus 1 may first establish wireless connection with n second image-forming apparatuses, and then establish connection with the computer device. Optionally, after establishing connection with the computer device, the image-forming apparatus 1 may establish wireless connection with n one or more other image-forming apparatuses and be disconnected from the computer device after obtaining the network configuration instruction from the computer device.

At 605, the image-forming apparatus 1 may update the pre-stored connection state information table according to the wireless connection established with n second image-forming apparatuses.

At 606, the image-forming apparatus 1 may inquire whether there is an upstream device according to updated connection state information table. If there is an upstream device, execute step 607; and if there is not an upstream device, execute step 610.

At 607, the image-forming apparatus 1 may send the network connection information to the upstream device, so that the upstream device may be connected to the local area network according to the network connection information. In the structure shown in FIG. 6, the image-forming apparatus 1 may send the network connection information to the image-forming apparatus 2. The image-forming apparatus 2 may be connected to the router based on the network connection information, that is, may be connected to the local area network.

At 608, the image-forming apparatus 1 may disconnect the wireless connection with the upstream device. In the structure shown in FIG. 6, the image-forming apparatus 1 may disconnect the wireless connection with the image-forming apparatus 2.

At 609, the image-forming apparatus 1 may update the connection state information table.

At 610, the image-forming apparatus 1 may inquire whether there is a downstream device according to updated connection state information table. If there is a downstream device, execute step 611; if there is not a downstream device, exit the method.

At 611, the image-forming apparatus 1 may send the network connection information to the downstream device, so that the downstream device may be connected to the local area network according to the network connection information. In the structure shown in FIG. 6, the image-forming apparatus 1 may send the network connection information to image-forming apparatuses 3, 5 . . . , and n+1.

At 612, the image-forming apparatus 1 may disconnect the wireless connection with the downstream device and establish connection with the router.

Optionally, in embodiments of the present disclosure, the image-forming apparatus 3 may be configured as the upstream device to send the network connection information to the image-forming apparatus 4. Optionally, the flow of the image-forming apparatus 3 sending the network connection information to the image-forming apparatus 4 may be same as the flow executed by the image-forming apparatus 1, which may not be described in detail herein.

Figure 9:
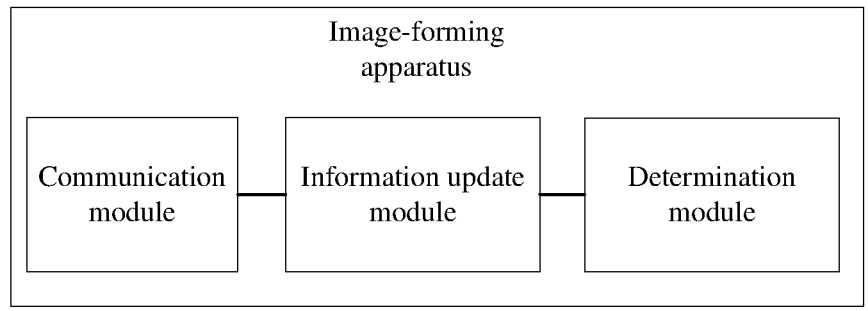
FIG. 9 illustrates a structural schematic of a network configuration apparatus according to exemplary embodiments of the present disclosure.

Corresponding to above-mentioned network configuration method, embodiments of the present disclosure provide a network configuration apparatus. The network configuration apparatus may be deployed on the image-forming apparatus. Optionally, the network configuration apparatus may be deployed on the first image-forming apparatus. As shown in FIG. 9, the network configuration apparatus may include a communication module, an information update module and a determination module.

The communication module may be configured to establish wireless connection with n second image-forming apparatuses, where n may be an integer greater than or equal to 1. The information update module may be configured to update the pre-stored connection state information table according to the wireless connection established with n second image-forming apparatuses. The determination module may be configured to determine m image-forming apparatuses to-be-connected-to-network based on updated connection state information table, where m may be an integer greater than or equal to 0. The communication module may be further configured to send the network connection information for connecting the local area network to m image-forming apparatuses to-be-connected-to-network, so that m image-forming apparatuses to-be-connected-to-network may be connected to the local area network according to the network connection information.

Figure 10:
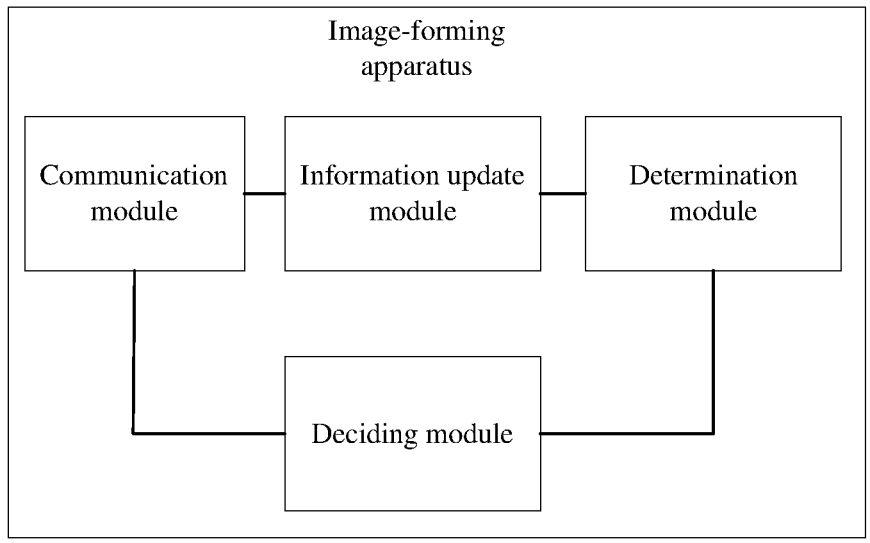
FIG. 10 illustrates a structural schematic of an image-forming apparatus according to exemplary embodiments of the present disclosure.

As shown in FIG. 10, the network configuration apparatus may further include a deciding module. The communication module may be configured to obtain the connection request sent by the second image-forming apparatus; the deciding module may be configured to decide whether the connection request includes the preset machine code; and the communication module may be configured to not respond to the connection request when the connection request does not include the preset machine code.

Optionally, the communication module may be configured to obtain the connection request sent by the second image-forming apparatus. The deciding module may be configured to decide whether the connection request includes the preset machine code; and may be configured to decide whether the preset machine code is consistent with the first preset rule when the connection request includes the preset machine code. The communication module may be configured to respond to the connection request when the preset machine code is consistent with the first preset rule.

Optionally, the determination module may be configured to obtain the machine codes respectively corresponding to n second image-forming apparatuses through the communication module; determine whether the machine code is consistent with the second preset set rule; and determine the second image-forming apparatus corresponding to the machine code which is consistent with the second preset rule as the image-forming apparatus to-be-connected-to-network.

Optionally, the determination module may be configured to decide the magnitude relationship between n and the preset threshold p through the deciding module, where the preset threshold p may be an integer greater than or equal to m; if n is greater than or equal to the preset threshold p, determine m second image-forming apparatuses from n second image-forming apparatuses as the image-forming apparatuses to-be-connected-to-network according to the third preset rule; and if n is less than the preset threshold p, determine n second image-forming apparatuses as the image-forming apparatuses to-be-connected-to-network.

Optionally, the communication module may be further configured to disconnect wireless connection with m image-forming apparatuses to-be-connected-to-network after sending the network connection information for connecting the local area network to m image-forming apparatuses to-be-connected-to-network.

Optionally, the communication module may be further configured to obtain the network connection response information of one or more other image-forming apparatuses different from the first image-forming apparatus after sending the network connection information for connecting the local area network to m image-forming apparatuses to-be-connected-to-network. The determination module may be further configured to determine whether the image-forming apparatus to-be-connected-to-network is connected to the local area network based on the network connection response information.

Figure 11:
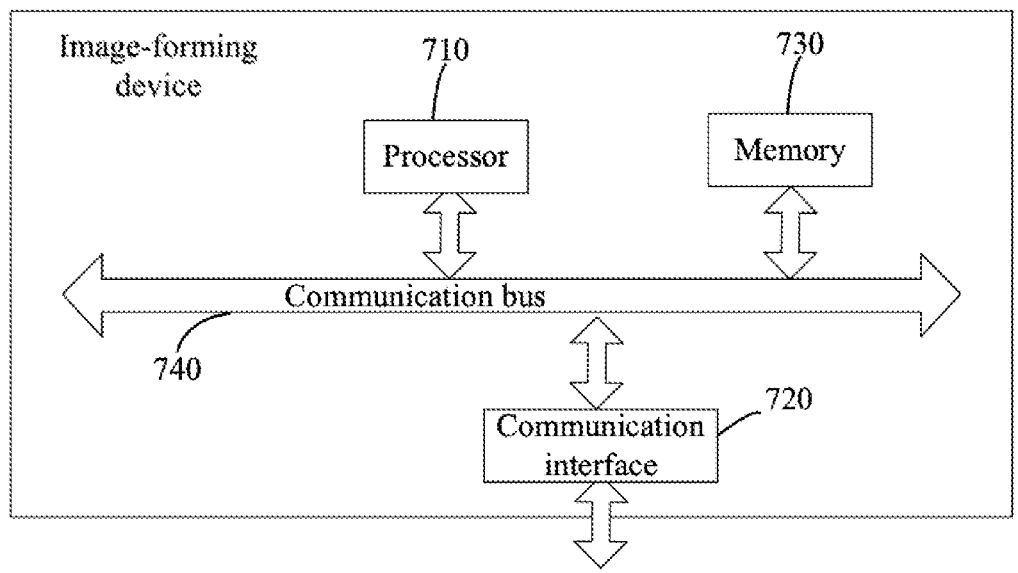
FIG. 11 illustrates a structural schematic of an image-forming device according to exemplary embodiments of the present disclosure.

FIG. 11 illustrates a structural schematic of an image-forming device according to exemplary embodiments of the present disclosure. As shown in FIG. 11, the image-forming device may be represented in the form of a general-purpose computing device. Components of the image-forming device may include, but may not be limited to, one or more processors 710, a communication interface 720, a memory 730, and a communication bus 740 connecting different system components (including the processor 710, the communication interface 720 and the memory 730).

The communication bus 740 may represent one or more of multiple types of bus structures, including a memory bus or memory controller, a peripheral bus, a graphic acceleration port, a processor, or a local bus using any of various bus structures. For example, such bus structures may include, but may not be limited to, an industry standard architecture (ISA) bus, a micro channel architecture (MAC) bus, an enhanced ISA bus, a video electronics standards association (VESA) local bus and a peripheral component interconnection (PCI) bus.

Electronic devices may typically include various computer system readable media. These media may be any available media that may be able to be accessed by the electronic device and include both volatile and nonvolatile media, and removable and non-removable media.

The memory 730 may include a computer system readable medium in the form of a volatile memory, such as a random access memory (RAM) and/or a cache memory. The electronic device may further include other removable/non-removable, volatile/nonvolatile computer system storage media. The memory 730 may include at least one program product. The program product may include a set (e.g., at least one) of program modules. These program modules may be configured to perform functions of various embodiments in the present disclosure.

The processor 710 may execute various functional applications and data processing by executing the programs stored in the memory 730, for example, implementing the network configuration method provided by embodiments of the present disclosure.

Embodiment of the present disclosure provide a computer-readable storage medium. The computer-readable storage medium may store computer instructions, and the computer instruction may cause the computer to execute the network configuration method provided by embodiments of the present disclosure.

Above-mentioned computer-readable storage medium may use any combination of one or more computer-readable storage media. The computer-readable medium may be a computer-readable signal medium or a computer-readable storage medium. A computer-readable storage medium may be, for example, but may not be limited to, an electrical, magnetic, optical, electromagnetic, infrared, or semiconductor system, apparatus, or device, or any combination thereof. Moreover, examples (non-exhaustive list) of the computer-readable storage media may include portable computer disks with one or more electrical connections, hard disks, random access memory (RAM), read only memory (ROM), erasable programmable read-only memory (EPROM) or flash memory, optical fibers, portable compact disk read-only memory (CD-ROM), optical storage devices, magnetic memory components, or any suitable combination of above components. In the present specification, the computer-readable storage medium may be any tangible medium that contains or stores a program; and the program may be used by or in conjunction with an instruction execution system, an apparatus, or a device.

Above-mentioned embodiments may be certain embodiments of the present disclosure. Any changes and substitutions which can be easily made by those skilled in the art should be covered by the protection scope of the present disclosure. The protection scope of the present disclosure should be determined by the protection scope of the claims.

What is claimed is:

1. A network configuration method, applied to a first image-forming apparatus, the method comprising:
   establishing wireless connection with n second image-forming apparatuses, wherein n is an integer greater than or equal to 1;
   updating a connection state information table pre-stored according to the wireless connection established with the n second image-forming apparatuses;
   based on the updated connection state information table, determining m image-forming apparatuses to-be-connected-to-network, wherein m is an integer greater than or equal to 0; and
   sending network connection information for connecting a local area network to the m image-forming apparatuses to-be-connected-to-network, such that the m image-forming apparatuses to-be-connected-to-network are connected to the local area network according to the network connection information.

2. The network configuration method according to claim 1, wherein establishing the wireless connection with the n second image-forming apparatuses includes:
   obtaining a connection request sent by a second image-forming apparatus;
   deciding whether the connection request includes a preset machine code; and
   if the connection request does not include the preset machine code, not responding to the connection request.

3. The network configuration method according to claim 1, wherein establishing the wireless connection with the n second image-forming apparatuses includes:
   obtaining a connection request sent by a second image-forming apparatus;
   deciding whether the connection request includes a preset machine code;
   if the connection request includes the preset machine code, deciding whether the preset machine code is consistent with a first preset rule; and
   if the preset machine code is consistent with the first preset rule, responding to the connection request.

4. The network configuration method according to claim 1, wherein based on the updated connection state information table, determining the m image-forming apparatuses to-be-connected-to-network includes:
   obtaining machine codes respectively corresponding to the n second image-forming apparatuses;
   deciding whether a machine code is consistent with a second preset rule; and
   if the machine code is consistent with the second preset rule, determining a second image-forming apparatus corresponding to the machine code which is consistent with the second preset rule as an image-forming apparatuses to-be-connected-to-network.

5. The network configuration method according to claim 1, wherein based on the updated connection state information table, determining the m image-forming apparatuses to-be-connected-to-network includes:
   deciding a magnitude relationship between n and a preset threshold p, wherein the preset threshold p is an integer greater than or equal to m;
   if n is greater than or equal to the preset threshold p, determining m second image-forming apparatuses, from the n second image-forming apparatuses, as the m image-forming apparatuses to-be-connected-to-network according to a third preset rule; and
   if n is less than the preset threshold p, determining the n second image-forming apparatuses as image-forming apparatuses to-be-connected-to-network.

6. The network configuration method according to claim 1, after sending the network connection information for connecting the local area network to the m image-forming apparatuses to-be-connected-to-network, further including:
   disconnecting the wireless connection with the m image-forming apparatuses to-be-connected-to-network.

7. The network configuration method according to claim 1, after sending the network connection information for connecting the local area network to the m image-forming apparatuses to-be-connected-to-network, further including:
   obtaining network connection response information of one or more other image-forming apparatuses different from the first image-forming apparatus; and
   determining whether an image-forming apparatus to-be-connected-to-network of the m image-forming apparatuses to-be-connected-to-network is connected to the local area network based on the network connection response information.

8. The network configuration method according to claim 7, wherein the network connection response information contain machine codes respectively corresponding to the one or more other image-forming apparatuses different from the first image-forming apparatus; and before obtaining the network connection response information of the one or more other image-forming apparatuses different from the first image-forming apparatus, the method further includes:
   connecting to the local area network; and
   sending a broadcast message on the local area network, such that the one or more other image-forming apparatuses different from the first image-forming apparatus in the local area network send the network connection response information, wherein:
      determining whether the image-forming apparatus to-be-connected-to-network of the m image-forming apparatuses to-be-connected-to-network is connected to the local area network based on the network connection response information includes:
         determining whether the image-forming apparatus to-be-connected-to-network of the m image-forming apparatuses to-be-connected-to-network is connected to the local area network according to the machine codes in the network connection response information.

9. The network configuration method according to claim 7, wherein
   establishing the wireless connection with the n second image-forming apparatuses includes assigning a static IP address used for connecting to the local area network for each second image-forming apparatus of the n second image-forming apparatuses; and
   before obtaining the network connection response information of the one or more other image-forming apparatuses different from the first image-forming apparatus, the method further includes:
   disconnecting the wireless connection with the m image-forming apparatuses to-be-connected-to-network;
   connecting to the local area network; and
   sending an inquiry instruction to each image-forming apparatus of the m image-forming apparatuses to-be-connected-to-network according to a static IP address of each image-forming apparatus of the m image-forming apparatuses to-be-connected-to-network on the local area network, such that each image-forming apparatus of the m image-forming apparatuses to-be-connected-to-network sends the network connection response information.

10. An image-forming apparatus, comprising:
a memory storing program instructions; and
a processor communicatively coupled to the memory and, when the program instructions being executed, configured to:
establish wireless connection with n second image-forming apparatuses, wherein n is an integer greater than or equal to 1;
update a connection state information table pre-stored according to the wireless connection established with the n second image-forming apparatuses; and
based on the updated connection state information table, determine m image-forming apparatuses to-be-connected-to-network, wherein m is an integer greater than or equal to 0, wherein:
the processor is further configured to send network connection information for connecting a local area network to the m image-forming apparatuses to-be-connected-to-network, wherein the m image-forming apparatuses to-be-connected-to-network are connected to the local area network according to the network connection information.

11. The image-forming apparatus according to claim 10, wherein the processor is further configured to:
obtain a connection request sent by the second image-forming apparatus;
decide whether the connection request includes a preset machine code; and
if the connection request does not include the preset machine code, not respond to the connection request.

12. The image-forming apparatus according to claim 10, wherein the processor is further configured to:
obtain a connection request sent by the second image-forming apparatus;
decide whether the connection request includes a preset machine code; and if the connection request includes the preset machine code, decide whether the preset machine code is consistent with a first preset rule; and
if the preset machine code is consistent with the first preset rule, respond to the connection request.

13. The image-forming apparatus according to claim 10, wherein the processor is further configured to:
obtain machine codes respectively corresponding to the n second image-forming apparatuses;
decide whether a machine code is consistent with a second preset rule; and
determine a second image-forming apparatus corresponding to the machine code which is consistent with the second preset rule as an image-forming apparatuses to-be-connected-to-network.

14. The image-forming apparatus according to claim 10, wherein the processor is further configured to:
decide a magnitude relationship between n and a preset threshold p, wherein the preset threshold p is an integer greater than or equal to m;
if n is greater than or equal to the preset threshold p, determine m second image-forming apparatuses, from the n second image-forming apparatuses, as the m image-forming apparatuses to-be-connected-to-network according to a third preset rule; and
if n is less than the preset threshold p, determine the n second image-forming apparatuses as image-forming apparatuses to-be-connected-to-network.

15. The image-forming apparatus according to claim 10, wherein the processor is further configured to:
after sending the network connection information for connecting the local area network to the m image-forming apparatuses to-be-connected-to-network, disconnect the wireless connection with the m image-forming apparatuses to-be-connected-to-network.

16. The image-forming apparatus according to claim 10, wherein the processor is further configured to:
after sending the network connection information for connecting the local area network to the m image-forming apparatuses to-be-connected-to-network, obtain network connection response information of one or more other image-forming apparatuses different from the image-forming apparatus; and
determine whether an image-forming apparatus to-be-connected-to-network of the m image-forming apparatuses to-be-connected-to-network is connected to the local area network based on the network connection response information.

17. The image-forming apparatus according to claim 16, wherein the network connection response information contain machine codes respectively corresponding to the one or more other image-forming apparatuses different from the first image-forming apparatus, wherein the processor is further configured to:
connect to the local area network;
send a broadcast message on the local area network, such that the one or more other image-forming apparatuses different from the first image-forming apparatus in the local area network send connection response information; and
determine whether an image-forming apparatus to-be-connected-to-network of the m image-forming apparatuses to-be-connected-to-network is connected to the local area network according to the machine codes in the network connection response information.

18. The image-forming apparatus according to claim 16, wherein the processor is further configured to:
assigning a static IP address used for connecting to the local area network for each second image-forming apparatus of the n second image-forming apparatuses; and
before obtaining the network connection response information of the one or more other image-forming apparatuses different from the first image-forming apparatus, disconnect the wireless connection with the m image-forming apparatuses to-be-connected-to-network; connect to the local area network; and send an inquiry instruction to each image-forming apparatus of the m image-forming apparatuses to-be-connected-to-network according to a static IP address of each image-forming apparatus of the m image-forming apparatuses to-be-connected-to-network on the local area network, such that each image-forming apparatus of the m image-forming apparatuses to-be-connected-to-network sends the network connection response information.

19. A non-transitory computer-readable storage medium containing a stored program, that when being executed, causes a device where the non-transitory computer-readable storage medium is located to execute a network configuration method, applied to a first image-forming apparatus, the method comprising:
establishing wireless connection with n second image-forming apparatuses, wherein n is an integer greater than or equal to 1;

updating a connection state information table pre-stored according to the wireless connection established with the n second image-forming apparatuses;

based on the updated connection state information table, determining m image-forming apparatuses to-be-connected-to-network, wherein m is an integer greater than or equal to 0; and sending network connection information for connecting a local area network to the m image-forming apparatuses to-be-connected-to-network, such that the m image-forming apparatuses to-be-connected-to-network are connected to the local area network according to the network connection information.

\* \* \* \* \*